United States Patent [19]

Kushida et al.

[11] Patent Number: 5,091,224
[45] Date of Patent: Feb. 25, 1992

[54] METHOD OF PREPARATION OF A SURFACE-COATED METAL-MADE ORNAMENTAL ARTICLE

[75] Inventors: Hachiro Kushida; Kazumi Hamano, both of Saitama; Yoshitsugu Imazawa, Tokyo; Kenji Irie, Kanagawa, all of Japan

[73] Assignee: Citizen Watch Co., Ltd.

[21] Appl. No.: 424,059

[22] Filed: Oct. 19, 1989

[30] Foreign Application Priority Data

Nov. 8, 1988 [JP] Japan .................. 63-282067

[51] Int. Cl.⁵ .............................. B05D 7/14
[52] U.S. Cl. .................... 427/419.4; 427/376.4; 427/387; 427/397.8; 427/419.6; 106/600; 428/429; 428/433; 428/447
[58] Field of Search ............ 427/376.2, 376.4, 376.5, 427/387, 397.8, 419.3, 419.4, 419.6; 428/429, 433, 447; 106/600

[56] References Cited

U.S. PATENT DOCUMENTS 4,355,135  10/1982  January .................. 427/387

FOREIGN PATENT DOCUMENTS

| | | | |
|---|---|---|---|
| 661372 | 4/1963 | Canada .................. | 427/387 |
| 856738 | 11/1970 | Canada .................. | 427/387 |
| 1163507 | 3/1984 | Canada .................. | 427/387 |
| 1291597 | 3/1969 | Fed. Rep. of Germany ... | 427/376.4 |
| 57-67665 | 4/1982 | Japan .................. | 427/387 |
| 2036053 | 6/1980 | United Kingdom .................. | 427/387 |

*Primary Examiner*—Shrive Beck
*Assistant Examiner*—Terry J. Owens
*Attorney, Agent, or Firm*—Wyatt, Gerber, Burke and Badie

[57] ABSTRACT

A metal-made ornamental article, such as watch cases and the like, is provided with a bilayered coating layer composed of an undercoating layer of a specified thickness formed from an aqueous colloidal solution of sodium silicate and silica sol in a specified proportion and a top-coating layer of a specified thickness formed by coating with a solution of a partial hydrolysis-condensation product of an organic silicate ester compound, such as ethyl silicate, followed by baking to effect curing of the coating layer.

5 Claims, No Drawings

METHOD OF PREPARATION OF A SURFACE-COATED METAL-MADE ORNAMENTAL ARTICLE

BACKGROUND OF THE INVENTION

The present invention relates to a surface-coated metallic ornamental article, especially, for personal use such as watch cases and watch straps as well as a method for the preparation thereof by providing a coating layer on the surface of a metallic substrate body. More particularly, the invention relates to a metallic ornamental article having a glassy protecting coating layer free from the disadvantageous phenomenon of blooming or whitening on the surface as well as a method for forming such a coating layer on the surface of a metallic substrate body.

It is a well known and widely practiced method of surface finishing that the surface of a metal-made personal ornamental article such as watch cases, watch straps and the like is provided with a hard protecting coating layer thereon with an object to impart the surface with insusceptibility to stain and resistance against scratches. For example, a metallic surface, either before or after a preliminary treatment such as honig treatment, hairline treatment and the like, is coated with an aqueous coating solution containing a sodium silicate and a silica sol in such a proportion as to give a $SiO_2$:-$Na_2O$ molar ratio of 4 to 10 followed by a heat treatment in air to form a glassy protecting layer. One of the serious disadvantages in this coating method is that the coating layer contains $Na_2O$ which reacts with the carbon dioxide in air to form a sodium carbonate so that the phenomenon of blooming or whitening on or in the coating layer is more or less unavoidable after lapse of time. Once sodium carbonate is formed within the coating layer to cause whitening, the sodium carbonate can hardly be removed so that the aesthetic value of the ornamental article is greatly decreased.

SUMMARY OF THE INVENTION

Accordingly, an object of the present invention is to provide a metal-made ornamental article, such as watch cases, watch straps and the like, having a scratch-resistant and stain-insusceptible surface-protecting coating layer without the disadvantageous phenomenon of blooming or whitening of the coating layer. The invention also has an object to provide a method for forming such a protecting coating layer on the surface of a metal-made ornamental article as the substrate.

Thus, the surface-coated metal-made ornamental article of the present invention comprises:

(a) a metal-made body of the article as the substrate;

(b) a glassy undercoating layer on the surface of the substrate made from a composition composed of sodium silicate and silica; and (c) a top-coating layer on the undercoating layer made from a hydrolysis-condensation product of an organic silicate ester compound.

The method of the invention accordingly comprises the successive steps of:

(A) coating the surface of a metal-made body of the article as the substrate with an aqueous coating solution containing sodium silicate and colloidal silica to form an undercoating layer;

(B) heating the undercoating layer to form a dried glassy coating film;

(C) coating the thus undercoated substrate with a solution of a partial hydrolysis-condensation product of an organic silicate ester compound to form a top-coating layer; and (D) heating the top-coating layer to effect curing of the same.

DETAILED DESCRIPTION OF THE PREFERRED EMBODIMENTS

As is described above, the most characteristic feature of the invention consists in that the surface of the metal-made article as the substrate is provided with a protecting coating layer having a bilayered structure composed of an undercoating formed from a composition of sodium silicate and colloidal silica and a top-coating formed by curing a partial hydrolysis-condensation product of an organic silicate ester compound.

The metal-made ornamental article to which the inventive method is applicable is not particularly limitative but, in particular, is an ornamental article for personal decorative use including watch cases, watch straps, necklaces, brooches, bracelets, earrings, hairpins and the like. The metal forming these articles is not particularly limitative but the article is made from or surface-plated with, preferably, a stainless steel, titanium metal, titanium-based alloy or copper-based alloy. It is of course optional that the metallic surface is subjected to a known pretreatment according to need such as a honing treatment, hairline treatment, nitridation, flame spraying and the like. The surface before the undercoating should be degreased and cleaned as completely as possible by washing with an alkaline solution and water.

The thus pretreated and cleaned surface of the metallic substrate body is then subjected to the undercoating treatment to form a glassy hard coating film having transparency thereon. The principal ingredients in the coating solution for this undercoating are sodium silicate and silica sol or colloidal silica. Although several commercial products of such a solution are available which contain from 20 to 21% by weight of $SiO_2$ and from 3.8 to 4.4% by weight of $Na_2O$, it should be noted that such a solution as obtained is not suitable for use as an undercoating solution. It is important that the solution for the undercoating contains from about 1.7 to about 5.0% by weight of $SiO_2$ and from about 0.3 to about 1.0% by weight of $Na_2O$. Such a coating solution can be obtained by diluting the above mentioned commercial product of the solution with pure water by 4 to 12 times. It is also important that the pure water used for diluting the solution is completely decarbonated, for example, by ion exchange treatment in order to minimize formation of sodium carbonate in the solution. When the concentration of the coating solution is too high, the undercoating layer has an excessively large thickness and may be subject to the phenomenon of blooming or whitening more or less. When the substrate surface has been subjected to a specific pretreatment such as a honing treatment, hairline treatment, embossing treatment and the like, the decorative effect obtained by these treatment would be decreased due to the excessively large thickness of the undercoating layer. When the concentration of the coating solution is too low, on the other hand, the thickness of the undercoating layer formed thereof by a single coating procedure may be so small that the desired effect of surface protection cannot be fully exhibited.

The above described coating solution for undercoating is applied to the surface of the substrate body by a suitable method such as dipping, spraying and the like followed by a heat treatment at a temperature in the range from 150° to 300° C. for 30 to 120 minutes to form the desired hard glassy undercoating layer having transparency. The thus formed undercoating layer should preferably have a thickness in the range from about 0.5 to about 5 μm.

The metallic substrate body having the undercoating layer formed in the above described manner is then provided with a top-coating layer by using a solution of a partial hydrolysis-condensation product of an organic silicate ester compound.

The above mentioned organic silicate ester compound is represented by the general formula

$$R^1{}_n Si(OR)_{4-n}. \tag{I}$$

in which R is a lower alkyl group selected from the class consisting of methyl, ethyl, propyl and butyl groups, $R^1$ is a methyl group or a phenyl group and the subscript n is zero, 1, 2 or 3. The organic silicate ester compound of the general formula (I) is exemplified by orthomethyl silicate, orthoethyl silicate, methyl triethoxy silane, phenyl triethoxy silane, methyl tributoxy silane, dimethyl diethoxy silane and the like, of which those having ethyl groups as the groups denoted by R are preferred. The coating solution for the top-coating can be prepared by dissolving the organic silicate ester compound in a suitable organic solvent, such as ethyl alcohol, containing a small amount of water as the reactant for hydrolysis to effect the partial hydrolysis reaction followed by the condensation reaction, if necessary, in the presence of a catalyst. It is less preferable in respect of the efficiency of the process to use a solution of the organic silicate ester compound without the partial hydrolysis-condensation reaction although the organic silicate ester compound can be hydrolyzed by reacting with atmospheric moisture after it is applied to the substrate surface. The concentration of the partial hydrolysis-condensation product in the coating solution is not particularly limitative depending on the desired thickness of the top-coating layer and in consideration of the efficiency in the coating works but it is usually in the range from 10 to 40% by weight or, preferably, from 20 to 40% by weight in order to obtain a top-coating layer having an appropriate thickness by a single coating process. It is of course optional that the partial hydrolysis-condensation reaction of the silicate ester compound is effected in a solution in a higher concentration to give a master solution which is diluted before use to have an appropriate concentration.

The coating solution for the top-coating is applied to the surface of the undercoating layer in a suitable method such as dipping, spraying and the like followed by drying and a heat treatment at a temperature in the range from about 150° to about 300° C. for about 30 to about 120 minutes so that the partial hydrolysis-condensation product of the coating layer is fully cured to give a highly protective top-coating layer. The thickness of the thus formed top-coating layer should preferably be in the range from about 0.5 to about 3 μm.

The thus formed top-coating layer has a pencil hardness of about 9H. Contrary to the generally accepted understanding that a coating layer having such a high hardness is hardly effective to be resistant against scratches, it is quite an unexpected discovery that the top-coating layer having such a high hardness is fully effective for surface protection when it is formed on the surface of a specific glassy undercoating layer. Namely, a synergistic effect is exhibited by the combination of the inorganic silicate-based undercoating layer and the organic silicate ester-based top-coating layer. The surface of the top-coating layer is free from contamination with, for example, fingerprints and highly resistive against scratches. The coating layer is not affected by the moisture or carbon dioxide contained in the atmospheric air not to cause the phenomenon of blooming or whitening so that the metallic ornamental article of the invention can retain the beautiful appearance lastingly.

In the following, the surface-coated metallic ornamental article of the invention and the method for the preparation thereof according to the invention are described in more detail by way of examples, in which the surface-coated metallic articles were evaluated by the following testing procedures. The results in each of these tests were recorded in four ratings of A for excellent, B for good, C for fair, and D for poor surface conditions.

I. Moisture Resistance

The coated metallic article was kept for 24 hours at 60° C. in an atmosphere of 95% relative humidity and the surface condition was visually examined.

II. Abrasion Resistance

The testing procedure was in accordance with JIS H 8615 by using a testing machine (Suga Abrasion Tester Model NUS-ISO-1).

III. Perspitation Resistance

The coated metallic article was immersed for 48 hours at 30° C. in an artificial perspiration containing: 9.9 g/liter of sodium chloride NaCl; 0.8 g/liter of sodium sulfide $Na_2S$; 1.7 g/liter of urea $(NH_4)_2CO$; 1.7 g/liter of lactic acid $CH_3-CHOH-COOH$ and 0.2 ml/liter of 28% ammonia water.

EXAMPLE 1

A watch case made from a titanium alloy was subjected to a honing treatment by using glass beads of #100 to #300 fineness on the surface followed by a degreasing treatment by washing with an alkali solution and then with water. The thus pretreated surface of the watch case was undercoated by dipping in a coating solution which was prepared by diluting a mixed colloidal solution containing sodium silicate and silica sol in such concentrations that the content of $SiO_2$ was 20% by weight and the content of $Na_2O$ was 4.0% by weight by about 6 times using fully decarbonated pure water obtained by ion exchange. After drying, the thus coated watch case was baked at about 200° C. for about 60 minutes to form a hard glassy undercoating film having a thickness of about 1.5 μm.

The thus undercoated watch case was further coated, by dipping, with a coating solution containing about 30% by weight of a partial hydrolysis-condensation product of ethyl silicate prepared by the addition of ethyl alcohol to a master solution containing about 60% by weight thereof in ethyl alcohol. After evaporation of the solvent, the watch case having the top-coating layer was baked by heating at about 250° C. for about 60 minutes to form a top-coating layer having a thickness of about 2.5 μm.

The results of the evaluation tests undertaken in the above described manner are shown in Table 1 given below.

EXAMPLE 2

The experimental procedure was substantially the same as in Example 1 except that the watch case as the substrate made from a titanium-based alloy was replaced with another watch case made from a stainless steel of the grade SUS 304 or SUS 316.

The results of the evaluation tests undertaken of the watch case coated in the above described manner are shown in Table 1 given below.

EXAMPLE 3

A watch case made from titanium metal was subjected to a honing treatment using glass beads of #100 to #300 fineness and the surface was degreased by washing first with an alkali solution and then with water.

The thus pretreated surface of the watch case was undercoated by spraying of a coating solution which was prepared by about 4 times dilution of a mixed colloidal solution containing sodium silicate and silica sol in such concentrations that the content of $SiO_2$ was 20% by weight and the content of $Na_2O$ was 4.0% by weight using fully decarbonated pure water obtained by ion exchange. After drying, the thus coated watch case was baked at about 250° C. for about 40 minutes to form a hard glassy undercoating film having a thickness of about 2.5 μm.

The thus undercoated watch case was further coated, by spraying, with a coating solution containing about 30% by weight of a partial hydrolysis-condensation product of ethyl silicate prepared by the addition of ethyl alcohol to a master solution containing about 60% by weight thereof in ethyl alcohol. After evaporation of the solvent, the watch case having the top-coating layer was baked by heating at about 200° C. for about 80 minutes to form a top-coating layer having a thickness of about 2.5 μm.

The results of the evaluation tests undertaken in the above described manner are shown in Table 1 given below.

EXAMPLE 4

A watch case made from a stainless steel SUS 304 and having a bezel of a titanium-based alloy was subjected to a honing treatment using glass beads of #100 to #300 fineness and the surface was degreased by washing first with an alkali solution and then with water.

The thus pretreated surface of the watch case was undercoated by spraying of a coating solution which was prepared by about 8 times dilution of a mixed colloidal solution containing sodium silicate and silica sol in such concentrations that the content of $SiO_2$ was 20% by weight and the content of $Na_2O$ was 4.0% by weight using fully decarbonated pure water obtained by ion exchange. After drying, the thus coated watch case was baked at about 150° C. for about 100 minutes to form a hard glassy undercoating film having a thickness of about 1.5 μm.

The thus undercoated watch case was further coated, by spraying, with a coating solution containing about 15% by weight of a partial hydrolysis-condensation product of ethyl silicate prepared by the addition of ethyl alcohol to a master solution containing about 60% by weight thereof in ethyl alcohol. After evaporation of the solvent, the watch case having the top-coating layer was baked by heating at about 150° C. for about 100 minutes to form a top-coating layer having a thickness of about 2.5 μm.

The results of the evaluation test undertaken in the above described manner are shown in Table 1 given below.

EXAMPLE 5

A watch case made from a copper-based alloy was subjected to a honing treatment using glass beads of #100 to #300 fineness and the surface was degreased by washing first with an alkali solution and then with water.

The thus pretreated surface of the watch case was undercoated by spraying of a coating solution which was prepared by about 10 times dilution of a mixed colloidal solution containing sodium silicate and silica sol in such concentrations that the content of $SiO_2$ was 20% by weight and the content of $Na_2O$ was 4.0% by weight using fully decarbonated pure water obtained by ion exchange. After drying, the thus coated watch case was baked at about 150° C. for about 90 minutes to form a hard glassy undercoating film having a thickness of about 1.0 μm.

The thus undercoated watch case was further coated, by spraying, with a coating solution containing about 30% by weight of a partial hydrolysis-condensation product of ethyl silicate prepared by the addition of ethyl alcohol to a master solution containing about 60% by weight thereof in ethyl alcohol. After evaporation of the solvent, the watch case having the top-coating layer was baked by heating at about 150° C. for about 100 minutes to form a top-coating layer having a thickness of about 2.5 μm.

The results of the evaluation tests undertaken in the above described manner are shown in Table 1 given below.

EXAMPLE 6

A watch strap made from a stainless steel SUS 304 was subjected to an embossing work to form a decorative relief pattern and the surface was degreased by washing first with an alkali solution and then with water.

The thus pretreated surface of the watch strap was undercoated by spraying of a coating solution which was prepared by about 12 times dilution of a mixed colloidal solution containing sodium silicate and silica sol in such concentrations that the content of $SiO_2$ was 20% by weight and the content of $Na_2O$ was 4.0% by weight using fully decarbonated pure water obtained by ion exchange. After drying, the thus coated watch strap was baked at about 150° C. for about 90 minutes to form a hard glassy undercoating film having a thickness of about 0.5 μm.

The thus undercoated watch strap was further coated, by spraying, with a coating solution containing about 30% by weight of a partial hydrolysis-condensation product of ethyl silicate prepared by the addition of ethyl alcohol to a master solution containing about 60% by weight thereof in ethyl alcohol. After evaporation of the solvent, the watch strap having the top-coating layer was baked by heating at about 150° C. for about 100 minutes to form a top-coating layer having a thickness of about 2.5 μm. The beautiful appearance of the relief pattern on the substrate surface was little affected by forming these coating layers thereon.

The results of the evaluation tests undertaken in the above described manner are shown in Table 1 given below. Example 7 (comparative).

A watch case made from a titanium-based alloy after a pretreatment including a honing treatment and degreasing was coated with an aqueous coating solution of sodium silicate and colloidal silica in a weight proportion of $SiO_2:Na_2O =$ about 4.8 followed by drying and baking at 200° C. for 30 minutes to form a glassy hard coating layer having a thickness of about 3 μm. The watch case coated in this manner was subjected to the same tests as in the preceding examples to give the results shown in Table 1.

TABLE 1

|  | Test Item | | | Overall evaluation |
|---|---|---|---|---|
|  | I | II | III |  |
| Example 1 | A | B | A | A |
| Example 2 | A | B | A | A |
| Example 3 | B | B | A | A |
| Example 4 | A | B | A | B |
| Example 5 | A | C | A | B |
| Example 6 | A | C | A | B |
| Example 7 | D | B | A | D |

What is claimed is:

1. A method for the preparation of a surface-coated metal-made ornamental article which comprises the steps of:
   (A) coating the surface of a metal-made body of the article as the substrate with an aqueous coating solution to form an undercoating layer, said solution containing from about 1.7 to about 5.0% by weight of $SiO_2$ and from about 0.3 to about 1.0% by weight of $Na_2O$;
   (B) heating the undercoating layer to form a dried glassy coating film;
   (C) coating the thus undercoated substrate with a solution of a partial hydrolysis-condensation product of an organic silicate ester compound to form a top-coating layer; and
   (D) heating the top-coating layer to effect curing of the same.

2. The method for the preparation of a surface-coated metal-made ornamental article as claimed in claim 1 wherein the heating in step (B) is conducted at a temperature in the range from 150° C. to 300° C. for a length of time in the range from 30 minutes to 120 minutes.

3. The method for the preparation of a surface-coated metal-made ornamental article as claimed in claim 1 wherein the organic silicate ester compound is represented by the general formula $$R^1{}_n Si(OR)_{4-n},$$

in which R is a lower alkyl group selected from the group consisting of methyl, ethyl, propyl and butyl groups, $R^1$ is a methyl group or a phenyl group and the subscript n is zero, 1, 2 or 3.

4. The method for the preparation of a surface-coated metal-made ornamental article as claimed in claim 3 wherein the organic silicate ester compound is ethyl silicate.

5. The method for the preparation of a surface-coated metal-made ornamental article as claimed in claim 1 wherein the heating in step (D) is conducted at a temperature in the range from 150° C. to 300° C. for a length of time in the range from 30 minutes to 120 minutes.

* * * * *